United States Patent
Manners (10) Patent No.: US 9,890,891 B2
(45) Date of Patent: Feb. 13, 2018

(54) LINER ASSEMBLY FOR PIPELINE REPAIR OR REINFORCEMENT AND METHOD OF INSTALLING SAME

(71) Applicant: NU FLOW TECHNOLOGIES 2000 INC., Oshawa (CA)

(72) Inventor: Cameron Manners, Oshawa (CA)

(73) Assignee: NU FLOW TECHNOLOGIES 2000 INC., Oshawa (CA)

( * ) Notice: Subject to any disclaimer, the term of this patent is extended or adjusted under 35 U.S.C. 154(b) by 0 days.

(21) Appl. No.: 14/984,858

(22) Filed: Dec. 30, 2015

(65) Prior Publication Data

US 2016/0186911 A1 Jun. 30, 2016

Related U.S. Application Data

(60) Provisional application No. 62/097,816, filed on Dec. 30, 2014.

(51) Int. Cl.
*F16L 55/165* (2006.01)

(52) U.S. Cl.
CPC .................. *F16L 55/1654* (2013.01)

(58) Field of Classification Search
CPC .................. F16L 55/1651; F16L 55/1656
USPC ....... 138/98, 97; 405/150.1, 182.4; 264/269, 264/516, 267; 156/94, 287, 294, 574
See application file for complete search history.

(56) References Cited

U.S. PATENT DOCUMENTS

| | | | |
|---|---|---|---|
| 4,009,063 A | 2/1977 | Wood | |
| 4,366,012 A | 12/1982 | Wood | |
| 4,976,290 A * | 12/1990 | Gelin | F16L 55/1656 138/141 |
| 5,395,472 A * | 3/1995 | Mandich | B29C 63/343 138/114 |
| 6,199,591 B1 | 3/2001 | Kiest, Jr. et al. | |
| 6,691,741 B2 | 2/2004 | Manners | |
| 6,708,729 B1 * | 3/2004 | Smith | F16L 55/1656 138/124 |
| 7,216,674 B2 * | 5/2007 | Manners | F16L 55/179 138/93 |
| 7,261,788 B1 | 8/2007 | Driver | |
| 7,448,413 B2 * | 11/2008 | Kiest, Jr. | F16L 55/1651 138/97 |
| 7,849,883 B2 * | 12/2010 | Manners | F16L 55/1654 138/97 |
| 2013/0098535 A1 | 4/2013 | Kiest, Jr. | |
| 2013/0312860 A1 | 11/2013 | Manners | |

OTHER PUBLICATIONS

International Search Report in PCT/CA2015/000611, dated Feb. 19, 2016.
Written Opinion of the International Searching Authority in PCT/CA2015/000611, dated Feb. 19, 2016.

* cited by examiner

*Primary Examiner* — Patrick F Brinson
(74) *Attorney, Agent, or Firm* — Knobbe, Martens, Olson & Bear, LLP (57) ABSTRACT

A liner assembly for pipeline repair or reinforcement includes an outer tubular liner, and an inner malleable inflatable bladder fabricated of a resilient material and positioned longitudinally within the tubular liner. The inflatable bladder has an outer surface configured to bond to the tubular liner and an inner surface configured to provide a resilient surface on the pipeline interior.

19 Claims, 8 Drawing Sheets

LINER ASSEMBLY FOR PIPELINE REPAIR OR REINFORCEMENT AND METHOD OF INSTALLING SAME

CROSS-REFERENCE TO RELATED APPLICATIONS

This application claims the benefit of U.S. Provisional Application No. 62/097,816 filed on Dec. 30, 2014, the content of which is incorporated herein by reference in its entirety.

FIELD

The subject application generally relates to pipeline repair and/or reinforcement and in particular, to a liner assembly for pipeline repair or reinforcement and to a method of installing the same.

BACKGROUND

Liners are commonly used to repair and/or reinforce ruptured or weak areas in pipeline networks such as sewer systems and the like. Conventional approaches for installing a liner into a pipeline typically involve excavation to expose the pipeline. However, as will be appreciated, excavation methods are expensive, time consuming and disruptive.

To avoid the problems associated with excavation, "cure-in-place" pipeline repair technology has been developed to allow pipelines to be repaired or reinforced without requiring disruptive excavation. During "cure-in-place" pipeline repair or reinforcement, a resin impregnated liner is delivered to the pipeline section to be repaired or reinforced, is brought into contact with the interior surface of the pipeline section and is maintained in place at that location until the curing process is complete.

Several approaches for positioning "cure-in-place" liners within a pipeline are used in the industry. For example, the liner can be pushed along the pipeline to a desired location using a series of push-rods. As will be appreciated, transitional areas along the pipeline such as bends and fittings create significant delivery problems, as the push-rods may be unable to effectively move beyond these transitional areas.

Alternatively, and more commonly used in the industry, the liner may be pulled along the pipeline to a desired location using a winch and cable. For example, U.S. Pat. No. 6,691,741 to Manners discloses an installation assembly for installing a liner in a pipeline comprising an inner bladder having an installation end and a retrieval end. An outer bladder surrounds the inner bladder. The ends of the inner and outer bladders are coupled together adjacent the installation end. The inner bladder is coupled to an air source at the retrieval end and the outer bladder adjacent the retrieval end is free. Following installation and curing of the liner, the bladder assembly is retrieved by pulling on the retrieval end of the inner bladder, and upon retrieval, the outer bladder is inverted.

Inversion delivery, wherein a liner is unrolled through itself by applied pressure as it projects forwardly into a pipeline, has also been described. For example, U.S. Pat. No. 4,366,012 to Wood discloses a method of impregnating the inner absorbent layer of a long flexible tube with a curable resin. During the method, a mass of the resin is introduced into one end of the tube. A window is formed in the impermeable outer layer of the tube at a distance from the resin mass. A vacuum in the interior of the tube is drawn through the window and concurrently the resin mass is pushed toward the evacuated region by passing the tube between a pair of squeezing members. When the flowing resin reaches the vicinity of the window, the window is sealed. Another window is formed in the tube farther downstream of the previously formed window. A vacuum is drawn through the new window while the squeezing members force the resin to flow toward the newly evacuated region. The procedure is repeated until the resin has spread through the entire inner absorbent layer of the tube.

Improvements are generally desired. It is therefore at least an object to provide a novel liner assembly for pipeline repair or reinforcement and a novel method of installing the same.

SUMMARY

Accordingly, in one aspect there is provided a liner assembly for pipeline repair or reinforcement, the liner assembly comprising: an outer tubular liner; and an inner malleable inflatable bladder fabricated of a resilient material and positioned longitudinally within the tubular liner, the inflatable bladder having an outer surface configured to bond to the tubular liner and an inner surface configured to provide a resilient surface on the pipeline interior.

The outer surface of the inflatable bladder may be a textured outer surface. The textured outer surface may be one or more of a roughened surface and a porous surface. The roughened surface may be formed by one or more of mechanical abrasion and chemical abrasion.

The liner assembly may further comprise a protective sheathing surrounding the tubular liner. The protective sheathing may be fitted to the outer surface of the tubular liner. The protective sheathing may comprise a first longitudinal edge and a second longitudinal edge, the second longitudinal edge being adapted to overlap the first longitudinal edge. The overlap may be tack welded.

The inflatable bladder having the outer surface may be a first inflatable bladder, and the liner assembly may further comprise: a second inflatable bladder positioned longitudinally within the first inflatable bladder.

The inflatable bladder may have a longitudinal over-expansion inhibiting element therein. The longitudinal over-expansion inhibiting element may be a longitudinal strap. The liner assembly may further comprise radial over-expansion inhibiting structure. The radial over-expansion inhibiting structure may comprise sleeves adjacent opposite ends of the liner assembly.

In another aspect, there is provided a method of installing a liner assembly for pipeline repair or reinforcement, the method comprising: pulling a prepared liner assembly into position in the pipeline, the liner assembly including an outer tubular liner and an inner malleable inflatable bladder positioned longitudinally within the tubular liner, the inflatable bladder being fabricated of a resilient material and having an outer surface configured to bond to the tubular liner and an inner surface configured to provide a resilient surface on the pipeline interior, the tubular liner and the outer surface being wetted with a curable compound; introducing fluid into the inflatable bladder so that the inflatable bladder expands to bring the tubular liner into firm contact with an interior surface of the pipeline; maintaining the liner assembly in an inflated condition for a time period sufficient for the tubular liner and the outer surface of the inflatable bladder to cure; and deflating the inflatable bladder and retrieving at least a portion of the liner assembly from the pipeline.

The outer surface of the inflatable bladder may be a textured outer surface. The method may further comprise: prior to said pulling, forming the textured outer surface on the inflatable bladder. The forming may comprise one or more of: mechanically abrading the outer surface of the inflatable bladder, and chemically abrading the outer surface of the inflatable bladder.

Retrieving at least the portion of the liner assembly from the pipeline may comprise retrieving an unbonded portion of the inflatable bladder from the pipeline. The method may further comprise: prior to said retrieving, cutting unbonded portions of the inflatable bladder from a bonded portion of the inflatable bladder using a cutting tool.

The inflatable bladder having the outer surface may be a first inflatable bladder, and the liner assembly may comprise a second inflatable bladder positioned longitudinally within the first inflatable bladder, wherein introducing fluid comprises introducing fluid into the second inflatable bladder, wherein maintaining the liner assembly in the inflated condition comprises maintaining the liner assembly in the inflated condition for a time period sufficient for the tubular liner, the outer surface of the first inflatable bladder, and the curable compound to cure, wherein deflating the inflatable bladder comprises deflating the second inflatable bladder, and wherein retrieving at least the portion of the liner assembly from the pipeline comprises retrieving the second inflatable bladder from the pipeline.

BRIEF DESCRIPTION OF THE DRAWINGS

Embodiments will now be described more fully with reference to the accompanying drawings in which.

DETAILED DESCRIPTION OF EMBODIMENTS

Figure 1:
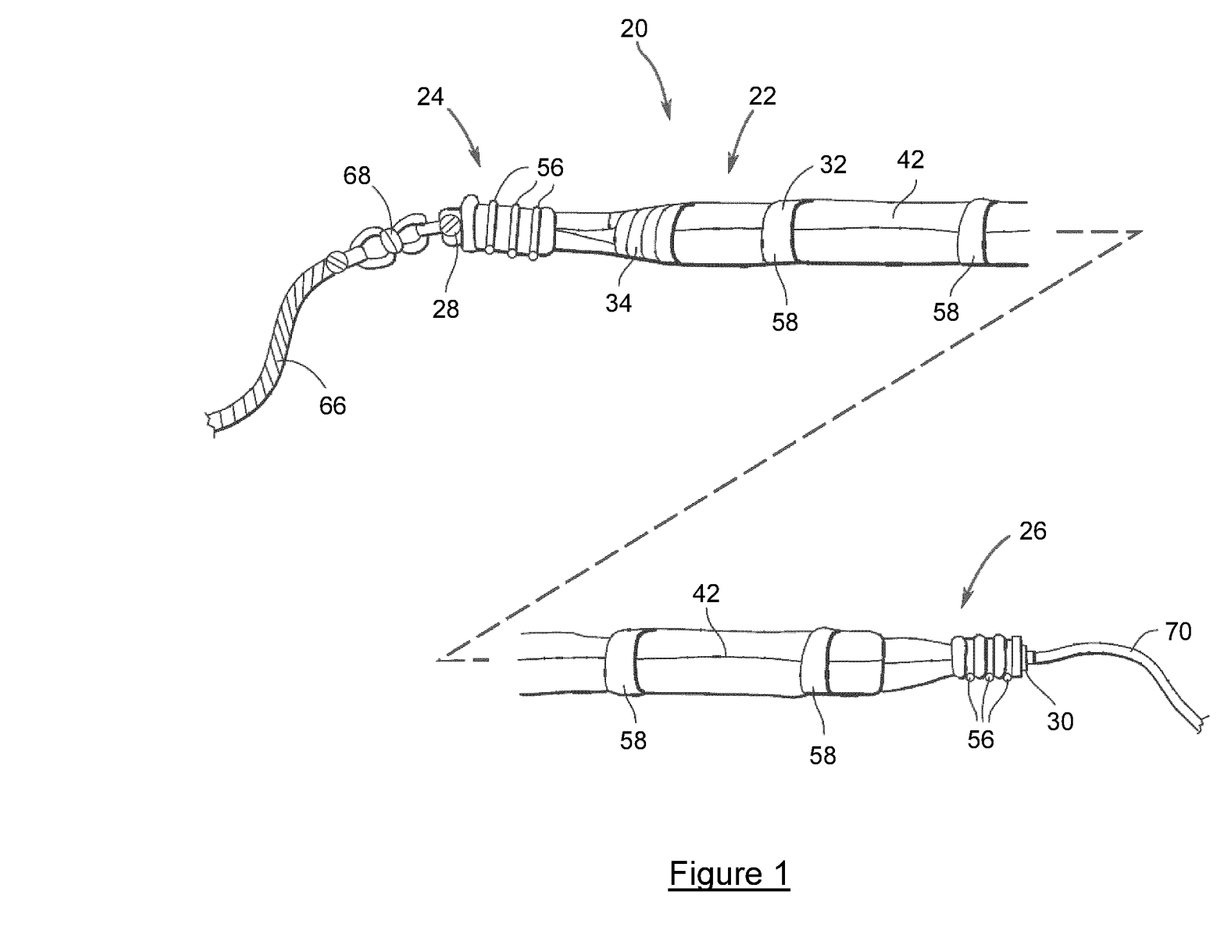
FIG. 1 is a side elevational view of a liner assembly for pipeline repair or reinforcement.

Turning now to FIG. 1, a liner assembly is shown and is generally identified by reference numeral 20. Liner assembly 20 includes a liner segment 22, which has an installation end 24 at one end thereof and an inflation end 26 at the opposite end thereof. To facilitate positioning of the liner assembly 20 in a pipeline, the installation end 24 is fitted with a pull block 28 that enables attachment of a suitable pull mechanism (i.e. a winch). The liner segment 22 is also fitted with an inflation block 30 at the inflation end 26, so as to allow the interior area of the liner segment 22 to be inflated. In the embodiment shown, the liner segment 22 is longitudinally folded over itself and bound at a plurality of spaced locations, in this example at twelve (12) to eighteen (18) inch intervals, using tape 32 or other suitable binding material. The liner assembly 20 further comprises tapered sections 34 formed proximate the installation end 24 and the inflation end 26. The longitudinal folded liner segment 22 and the tapered sections 34 of the liner assembly 20 allow the liner assembly 20 to be manipulated and moved to a desired location within the pipeline.

Figure 2:
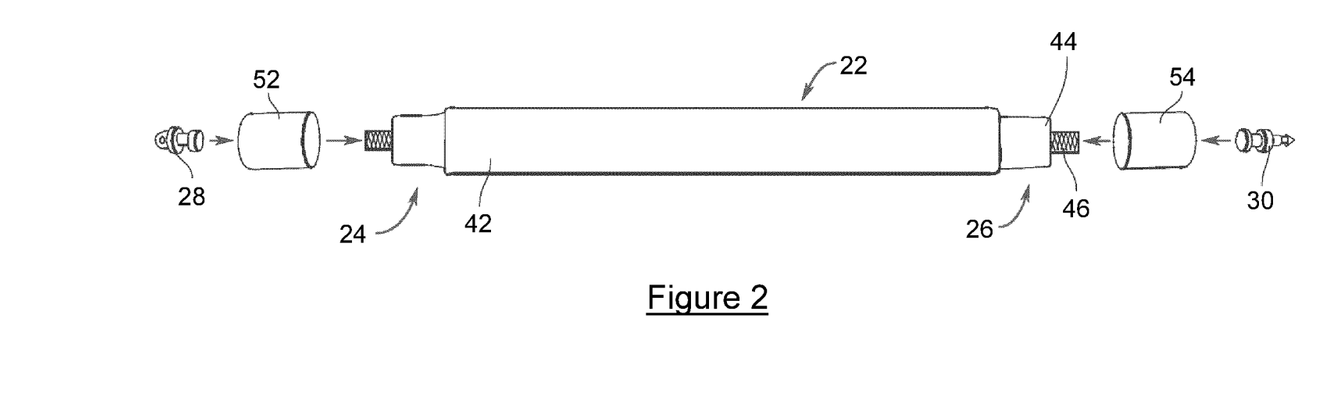
FIG. 2 is a partially exploded side elevational view of a liner segment forming part of the liner assembly of FIG. 1.
Figure 3:
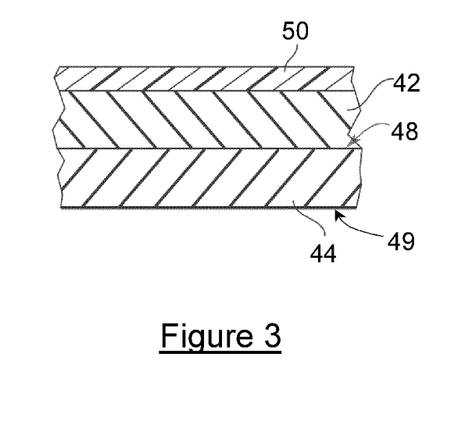
FIG. 3 is a cross-sectional view of a portion of the liner segment of FIG. 2.

FIGS. 2 and 3 better illustrate the liner segment 22. Liner segment 22 is generally provided in stock manufactured lengths, and is preferably provided on a roll, with desired lengths being cut from stock. The liner segment 22 is generally dimensioned to suit pipelines ranging from 1½ inches up to 12", but those of skill in the art will appreciate that the liner segment 22 may be dimensioned to accommodate smaller or larger pipeline diameters. As can be seen, liner segment 22 is multi-layered, and comprises a tubular liner 42, an elongate malleable inflatable bladder 44 fabricated of a resilient material and extending longitudinally through the tubular liner, and a longitudinal over-expansion inhibiting element in the form of a non-stretchable strap 46 positioned within and extending the length of the inflatable bladder 44. In this embodiment, the tubular liner 42 is fabricated of a felt material, the malleable inflatable bladder 44 is fabricated of rubber, and the non-stretchable strap 46 is fabricated of woven nylon. The malleable inflatable bladder 44 has a textured outer surface 48 that is configured to bond to an inner surface of the tubular liner 42. The textured outer surface 48 has an increased surface area, as compared to an otherwise smooth, non-textured surface. As will be understood, the increased surface area of the textured outer surface 48 increases the effective interfacial area between the tubular liner 42 and the inflatable bladder 44, and also increases the amount of resin that may be accommodated at the interface between the tubular liner 42 and the inflatable bladder 44 during resin wetting, described below. In this embodiment, the textured outer surface 48 is a roughened surface, and is formed by mechanically abrading the outer surface of the inflatable bladder 44 with an abrasive tool or material, such as for example sandpaper. The internal bladder 44 also has an inner surface 49 that is configured to provide a resilient surface on the pipeline interior. The liner segment 22 further comprises a plastic sheathing 50 over the outer surface of the tubular liner 42. In this embodiment, the plastic sheathing 50 has a first longitudinal edge that is configured to overlap a second longitudinal edge, and the overlap is tack welded for fitting the plastic sheathing 50 to the outer surface of the tubular liner 42. Non-stretchable retaining sleeves 52 and 54 are positioned adjacent opposite ends of the liner segment 22 to inhibit radial over-expansion of the liner assembly 20.

In use, to repair or reinforce a damaged section of pipeline, the required length of liner is first determined. In this embodiment, a video camera connected to a video camera line is inserted into and moved along the interior of the pipeline. The camera line is marked at positions corresponding to the ends of the damaged section of pipeline to be repaired or reinforced. To ensure that the liner segment 22 adequately covers the interior area of the pipeline to be repaired or reinforced, and to allow the liner segment 22 to be trimmed as needed and to have the appropriate installation gear fitted thereto, an extra length portion is added to each end of the liner segment. In this embodiment, the extra length portion is approximately equal to 10" (250 mm). A liner segment 22 having an appropriate length is then cut from stock.

The cut liner segment 22 is then prepared in accordance with FIG. 2. Thus, during preparation, portions of the tubular liner 42 and the plastic sheathing 50 proximate the ends 24 and 26 of the liner segment 22 are removed by cutting so as to expose the underlying malleable inflatable bladder 44. For smaller diameter liners (up to 4"), about 6" of exposed inflatable bladder is sufficient. For larger diameter liners, about 9" of exposed inflatable bladder is sufficient. The tubular liner 42, plastic sheathing 50 and malleable inflatable bladder 44 are then trimmed to expose a length (i.e. 4") of strap 46 at each of the ends 24 and 26.

Figure 4A:
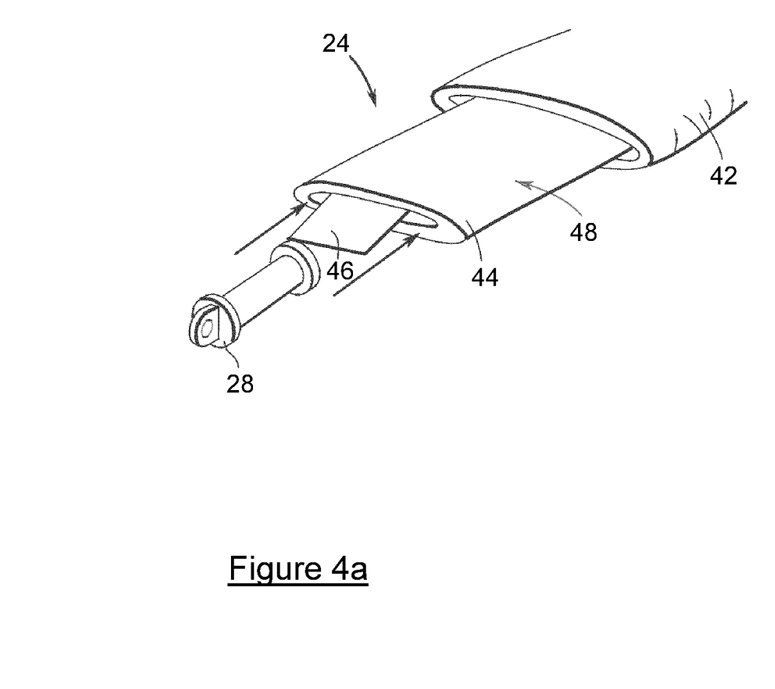
FIGS. 4a and 4b are perspective views showing installation of a pull block during assembly of the liner assembly of FIG. 1.
Figure 4B:
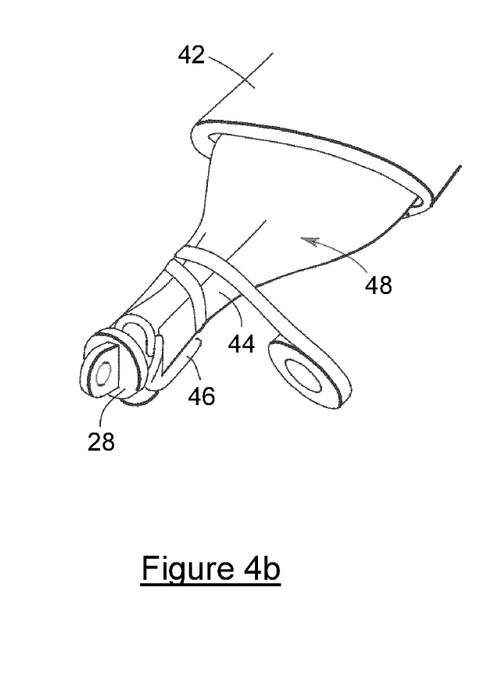

To prepare the trimmed liner segment 22 for installation, installation end 24 and inflation end 26 are sealed with suitable installation gear. As shown in FIG. 4a, at installation end 24, the pull block 28 is inserted into the inflatable bladder 44. The inflatable bladder 44 in the region surrounding the inserted pull block 28 is subsequently folded in or cinched (as shown in FIG. 4b) onto the pull block 28, ensuring a fit that is sufficiently tight for allowing inflation of the inflatable bladder 44 later in the procedure. During preparation of installation end 24, strap 46 is tightly incorporated either into the folds of the inflatable bladder 44, or into the taping used to securely maintain this arrangement at installation end 24, as shown in FIG. 4b. Inflation end 26 is similarly prepared (not shown), substituting inflation block 30 for the pull block 28 of the installation end 24. Similar to installation end 24, strap 46 is tightly incorporated into the folds or taping at inflation end 26.

The tubular liner 42 is removed from the liner segment, and the textured outer surface 48 is then formed on the outer surface of the inflatable bladder 44. In this embodiment, the textured outer surface 48 is a roughened surface, and is formed by mechanically abrading (not shown) the outer surface of the inflatable bladder 44 with sandpaper. Once the textured outer surface 48 has been formed, the tubular liner 42 is then replaced onto the liner segment.

Figure 5A:
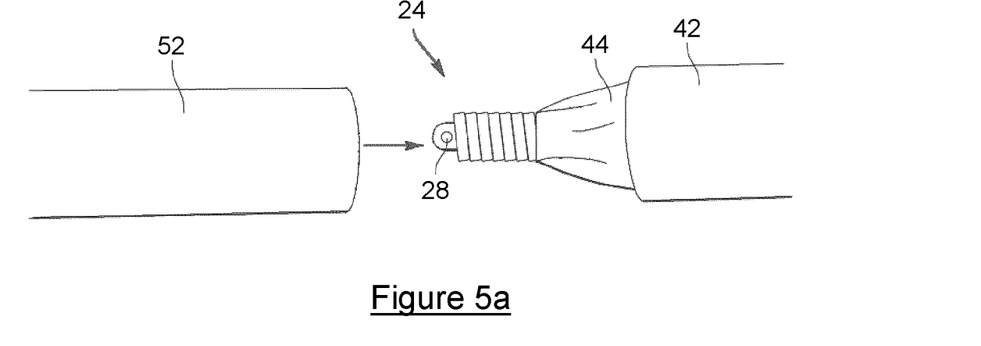
FIGS. 5a to 5c are side elevational views showing installation of a retaining sleeve during assembly of the liner assembly of FIG. 1.
Figure 5B:
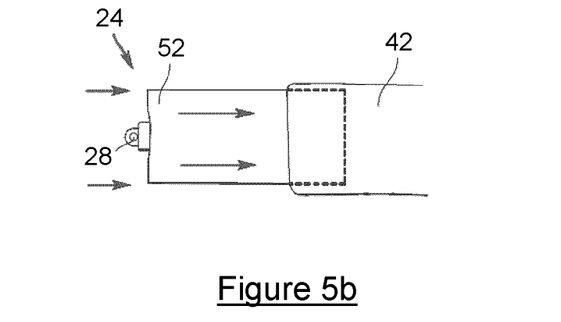
Figure 5C:
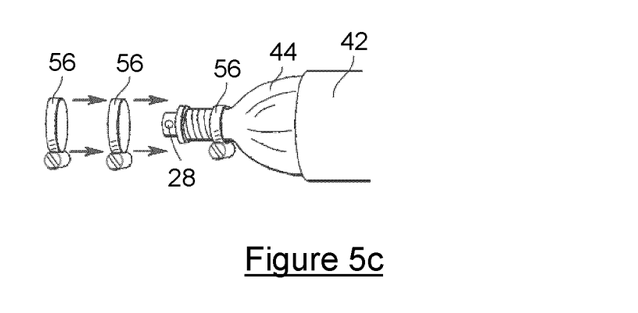

The ends 24, 26 of the liner assembly 20 are further prepared by inserting, between the tubular liner 42 and the inflatable bladder 44, proximate each end 24, 26, the retaining sleeves 52, 54, as shown in FIG. 5a (only end 24 and retaining sleeve 42 are shown). Each retaining sleeve 52, 54 is cut to a length that starts at the front edge of the installation gear (i.e. pull block 28 or inflation block 30) and extends into the liner at least 6", as shown in FIG. 5b. As shown in FIG. 5c, at each end 24, 26, the retaining sleeve 52, 54 is folded in, over the taped ends previously prepared, and securely taped. Each end 24, 26 is then further secured using suitable clamps 56 to ensure a tight fit around the blocks positioned therein. In the embodiment shown, clamps 56 are gear clamps.

With the liner assembly 20 sealed at both ends 24, 26 with the appropriate installation gear, the outer tubular liner 42 is impregnated with an appropriate resin (i.e. epoxy). The process of impregnating the outer tubular liner 42 is commonly referred to as "wetting". In this embodiment, the outer tubular liner 42 is wetted by delivering resin to the space between the outer tubular liner 42 and the inflatable bladder 44 at one of the ends 24, 26. Rollers (not shown) are then used to move the resin along the length of the tubular liner 42, as is known in the art. To ensure complete wetting of the tubular liner 42, resin can be applied to both ends 24, 26. As will be understood, the complete wetting of the tubular liner 42 also results in complete wetting of the textured outer surface 48 of the inflatable bladder 44, which is brought into intimate contact with the tubular liner 42 during use of the rollers.

After the tubular liner 42 and the textured outer surface 48 have been wetted, the plastic sheathing 50 is scored to facilitate migration of the resin out of the tubular liner 42. Contact of the resin with the pipeline being repaired ensures that the liner being installed is fixed in place. The outside surface of plastic sheathing is then wiped to ensure a clean dry surface. Turning again to FIG. 1, the liner assembly 20 is then longitudinally folded and taped at approximately 12" to 18" intervals 58 to retain this folded arrangement.

To facilitate entry and/or movement of the liner assembly 20 in a pipeline, the leading edge of the tubular liner 42 is then taped to form a tapered configuration 62. A winch cable 66 is attached to pull block 28 at installation end 24. In this embodiment, clevises 68 are used to attach winch cable 66 to the pull block 28. An air line 70 is attached to inflation block 30 of inflation end 26.

Figure 6A:
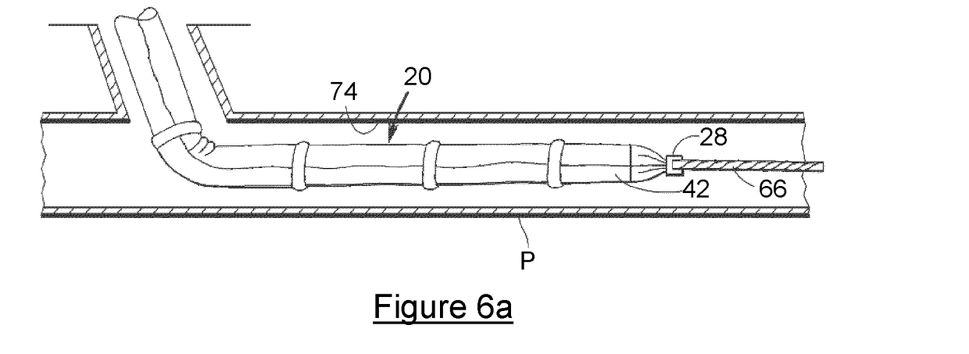
FIGS. 6a to 6c are side elevational views, partly in section, showing installation of the liner assembly of FIG. 1, comprising the liner segment of FIG. 2, into a pipeline to be repaired or reinforced.
Figure 6B:
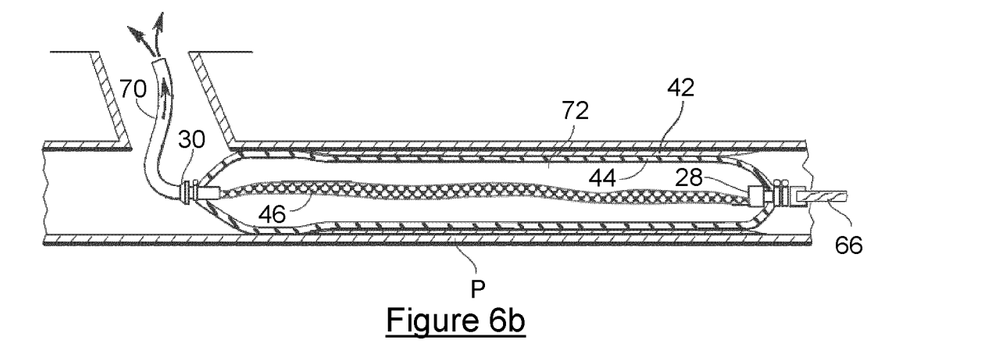

FIGS. 6a through 6c show installation of the liner assembly 20 in a section of pipeline P. During installation, the winch (not shown) is used to pull the liner assembly 20 into the pipeline P via winch cable 66, as shown in FIG. 6a. The liner assembly 20 is positioned within the pipeline section to be repaired or reinforced. Once the liner assembly 20 is at the desired position, an air pump (not shown) is operated to supply air through the air line 70 connected to inflation block 30. Air supplied through the air line 70 passes through inflation block 30 and enters internal reservoir 72 of the inflatable bladder 44. The inflatable bladder 44 is in turn inflated until the liner assembly 20 expands to the point where the tubular liner 42 firmly contacts the interior surface 74 of the pipeline, as shown in FIG. 6b. During inflation, the taped portions of the liner assembly 20 release, allowing the liner assembly, and surrounding plastic sheathing 50 to expand and contact the interior surface 74. The liner assembly 20 is then maintained in this condition for a time period sufficient to enable the wetted outer felt tubular liner 42 to cure, together with the inflatable bladder 44 in contact therewith.

Figure 6C:
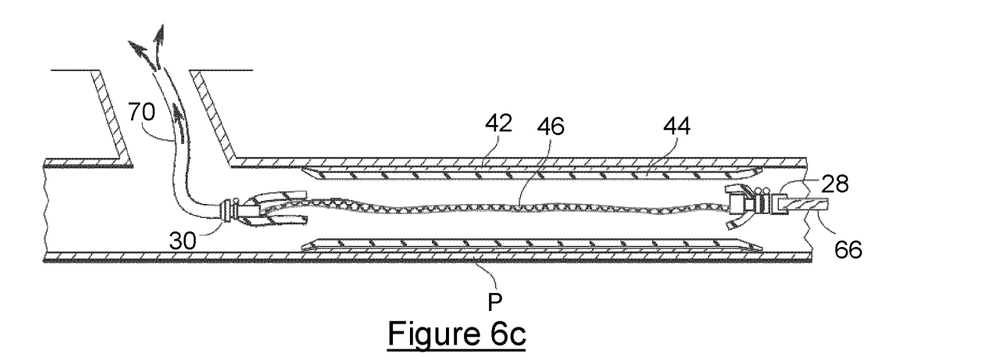

Following curing, the inflatable bladder 44 is cut adjacent each end 24 and 26, and specifically at the boundary between the bonded portion and each unbonded end portion (see FIG. 6c), using a suitable cutting tool (not shown), such as for example a knife. Once the inflatable bladder 44 has been cut, the non-extendable strap 46 with the unbonded end portions is then pulled from the pipeline P via winch cable 66, leaving the cured tubular liner 42 and the bonded portion of the inflatable bladder 44 in position within the pipeline.

The appropriate air pressure for inflating the inflatable bladder 44 depends on the diameter of the liner assembly. In general, liner assemblies having a diameter ranging from 3" to 12" are inflated to a pressure of about 12 to 15 pounds per square inch (psi). Liner assemblies of smaller diameter (i.e. 1½" and 2" liners) are inflated to a pressure of about 24 psi. During inflation, the air pressure should be sufficient to break the tape 32 spaced along the longitudinally folded liner assembly 20, allowing the liner assembly 20 to fill the pipeline section being repaired or reinforced.

As will be appreciated, the inner surface 49 of the bonded portion of the inflatable bladder 44 that remains in position in the pipeline P provides a resilient surface on the pipeline interior, which advantageously increases the erosive wear resistance of the repaired or restored section of pipeline. As will be understood, increasing the erosive wear resistance renders the pipeline more suitable for conveying abrasive fluids, such as liquid slurries (e.g. drilling fluid, mining slurry, and the like), or granular flows, such as dried grains (e.g. hops, rice, wheat, corn, and the like), and increases the service life of the pipeline.

As will be appreciated, the increased surface area of the textured outer surface 48 increases the effective interfacial area between the tubular liner 42 and the inflatable bladder 44, which advantageously increases the strength of the bonded interface between the tubular liner 42 and the inflatable bladder 44. As will be understood, increasing the strength of the bonded interface reduces or eliminates any tendency of the bonded portion of the cured inflatable bladder 44 to delaminate from the tubular liner 42 during use of the pipeline.

Figure 7:
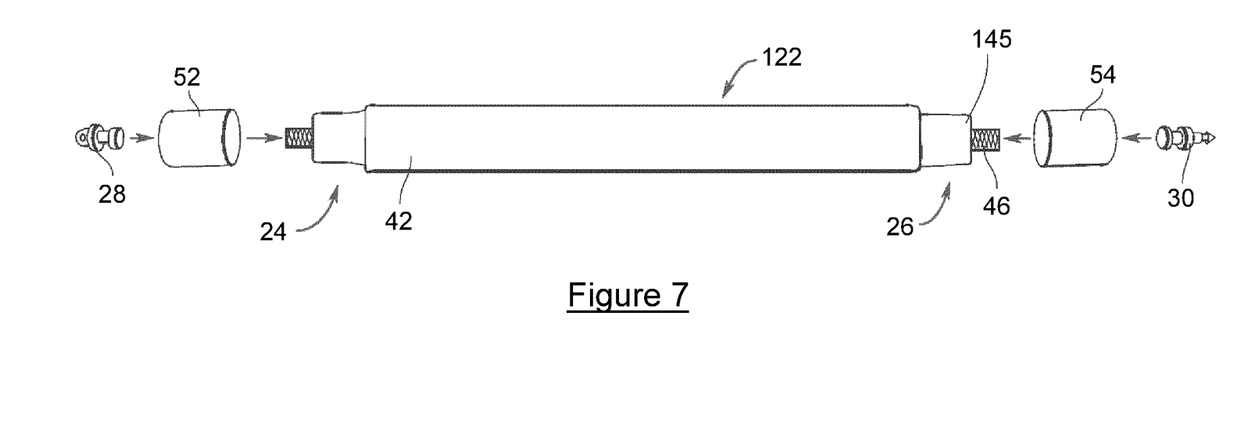
FIG. 7 is a partially exploded side elevational view of a liner segment forming part of the liner assembly of FIG. 1.
Figure 8:
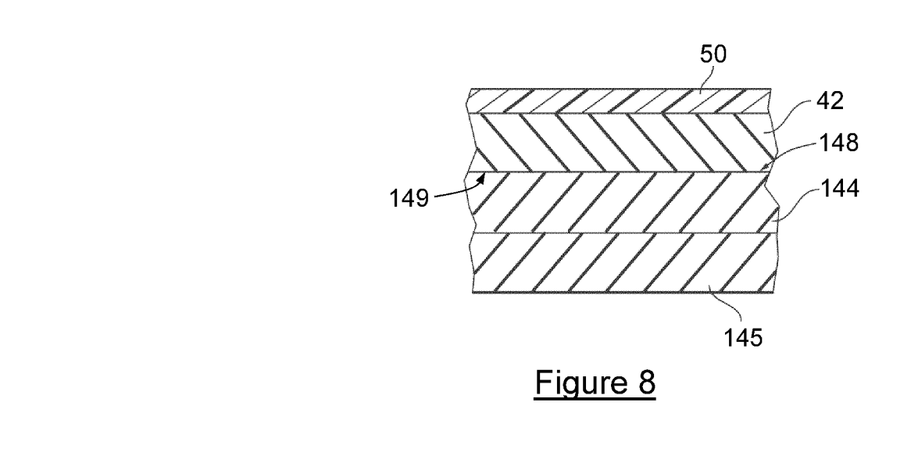
FIG. 8 is a cross-sectional view of the liner segment of FIG. 7.

In other embodiments, the liner segment forming part of the liner assembly 20 may be differently configured. For example, FIG. 7 shows another embodiment of a liner segment, which is generally indicated by reference numeral 122. Liner segment 122 is generally similar to liner segment 22 described above and with reference to FIGS. 2 to 6, and is provided in stock manufactured lengths, and is preferably provided on a roll, with desired lengths being cut from stock. The liner segment 122 is generally dimensioned to suit pipelines ranging from 1½ inches up to 12", but those of skill in the art will appreciate that the liner segment 122 may be dimensioned to accommodate smaller or larger pipeline diameters. As can be seen, liner segment 122 is multi-layered, and comprises the tubular liner 42, a first elongate malleable inflatable bladder 144 positioned longitudinally within the tubular liner 42, a second elongate malleable inflatable bladder 145 extending longitudinally through the first inflatable bladder 144, and the non-stretchable strap 46 positioned within and extending the length of the second inflatable bladder 145. In this embodiment, the tubular liner 42 is fabricated of a felt material, the first and second malleable inflatable bladders 144 and 145 are fabricated of rubber, and the non-stretchable strap 46 is fabricated of woven nylon. The first inflatable bladder 144 has a textured outer surface 148 that is configured to bond to an inner surface of the tubular liner 42. The textured outer surface 148 has an increased surface area, as compared to an otherwise smooth, non-textured surface. As will be understood, the increased surface area of the textured outer surface 148 increases the effective interfacial area between the tubular liner 42 and the inflatable bladder 144, and also increases the amount of resin that may be accommodated at the interface between the tubular liner 42 and the inflatable bladder 144 during resin wetting, described below. In this embodiment, the textured outer surface 148 is a roughened surface, and is formed by mechanically abrading the outer surface of the inflatable bladder 144 with an abrasive tool or material, such as for example sandpaper. The internal bladder 144 also has an inner surface 149 that is configured to provide a resilient surface on the pipeline interior. The liner segment 122 further comprises the plastic sheathing 50 over the outer surface of the tubular liner 42. In this embodiment, the plastic sheathing 50 has a first longitudinal edge that is configured to overlap a second longitudinal edge, and the overlap is tack welded for fitting the plastic sheathing 50 to the outer surface of the tubular liner 42. Non-stretchable retaining sleeves 52 and 54 are positioned adjacent opposite ends of the liner segment 122 to inhibit radial over-expansion of the liner assembly 20.

In use, to repair or reinforce a damaged section of pipeline, the required length of liner is first determined. In this embodiment, a video camera connected to a video camera line is inserted into and moved along the interior of the pipeline. The camera line is marked at positions corresponding to the ends of the damaged section of pipeline to be repaired or reinforced. To ensure that the liner segment 122 adequately covers the interior area of the pipeline to be repaired or reinforced, and to allow the liner segment 122 to be trimmed as needed and to have the appropriate installation gear fitted thereto, an extra length portion is added to each end of the liner segment. In this embodiment, the extra length portion is approximately equal to 10" (250 mm). A liner segment 122 having an appropriate length is then cut from stock.

The cut liner segment 122 is then prepared in accordance with FIG. 7. Thus, during preparation, portions of the tubular liner 42, the first inflatable bladder 144, and the plastic sheathing 50 proximate the ends 24 and 26 of the liner segment 22 are removed by cutting so as to expose the underlying second inflatable bladder 145. For smaller diameter liners (up to 4"), about 6" of exposed second inflatable bladder is sufficient. For larger diameter liners, about 9" of exposed second inflatable bladder is sufficient. The tubular liner 42, plastic sheathing 50 and first and second inflatable bladders 144 and 145 are then trimmed to expose a length (i.e. 4") of strap 46 at each of the ends 24 and 26.

Figure 9A:
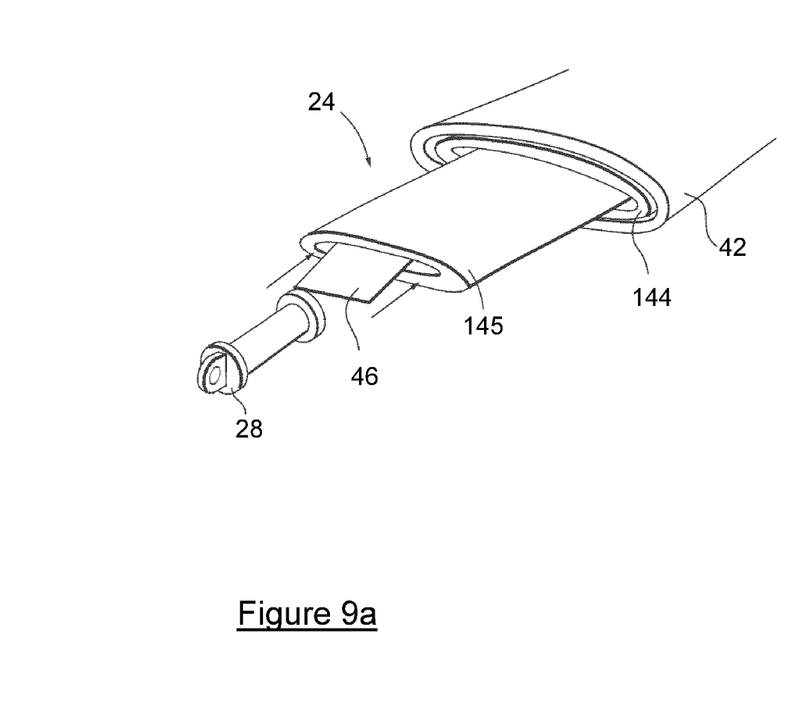
FIGS. 9a and 9b are perspective views showing installation of a pull block during assembly of the liner assembly of FIG. 1, comprising the liner segment of FIG. 7.
Figure 9B:
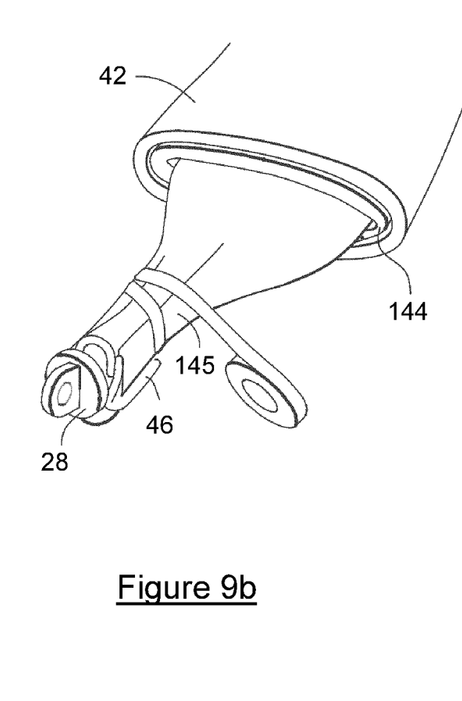

To prepare the trimmed liner segment 122 for installation, installation end 24 and inflation end 26 are sealed with suitable installation gear. As shown in FIG. 9a, at installation end 24, the pull block 28 is inserted into the second inflatable bladder 145. The second inflatable bladder 145 in the region surrounding the inserted pull block 28 is subsequently folded in or cinched (as shown in FIG. 9b) onto the pull block 28, ensuring a fit that is sufficiently tight for allowing inflation of the second inflatable bladder 145 later in the procedure. During preparation of installation end 24, strap 46 is tightly incorporated either into the folds of the second inflatable bladder 145, or into the taping used to securely maintain this arrangement at installation end 24, as shown in FIG. 9b. Inflation end 26 is similarly prepared (not shown), substituting inflation block 30 for the pull block 28 of the installation end 24. Similar to installation end 24, strap 46 is tightly incorporated into the folds or taping at inflation end 26.

The tubular liner 42 is removed from the liner segment, and the textured outer surface 148 is then formed on the outer surface of the first inflatable bladder 144. In this embodiment, the textured outer surface 148 is a roughened surface, and is formed by mechanically abrading (not shown) the outer surface of the first inflatable bladder 144 by sanding with sandpaper. Once the textured outer surface 148 has been formed, the tubular liner 42 is then replaced onto the liner segment.

The ends 24, 26 of the liner assembly 20 are further prepared by inserting, between the first inflatable bladder 145 and the second inflatable bladder 145, proximate each end 24, 26, the retaining sleeves 52, 54 (not shown). Each retaining sleeve 52, 54 is cut to a length that starts at the front edge of the installation gear (i.e. pull block 28 or inflation block 30) and extends into the first inflatable bladder 144 at least 6". At each end 24, 26, the retaining sleeve 52, 54 is folded in, over the taped ends previously prepared, and securely taped. Each end 24, 26 is then further secured using suitable clamps 56 to ensure a tight fit around the blocks positioned therein. In this embodiment, the clamps are gear clamps.

With the liner assembly 20 sealed at both ends 24, 26 with the appropriate installation gear, the outer tubular liner 42 is impregnated with an appropriate resin (i.e. epoxy). The process of impregnating the outer tubular liner 42 is commonly referred to as "wetting". In this embodiment, the outer tubular liner 42 is wetted by delivering resin to the space between the outer tubular liner 42 and the first inflatable bladder 144 at one of the ends 24, 26. Rollers (not shown) are then used to move the resin along the length of the tubular liner 42, as is known in the art. To ensure complete wetting of the tubular liner 42, resin can be applied to both ends 24, 26. As will be understood, the complete wetting of the tubular liner 42 results in complete wetting of the textured outer surface 148 of the first inflatable bladder 144, which is brought into intimate contact with the tubular liner 42 during use of the rollers.

After the tubular liner 42 and the textured outer surface 148 have been wetted, the plastic sheathing 50 is scored to facilitate migration of the resin out of the tubular liner 42. Contact of the resin with the pipeline being repaired ensures that the liner being installed is fixed in place. The outside surface of plastic sheathing is then wiped to ensure a clean dry surface. The liner assembly 20 is then longitudinally folded and taped at approximately 12" to 18" intervals 58 to retain this folded arrangement.

To facilitate entry and/or movement of the liner assembly 20 in a pipeline, the leading edge of the tubular liner 42 is then taped to form a tapered configuration 62. A winch cable 66 is attached to pull block 28 at installation end 24. In this embodiment, clevises 68 are used to attach winch cable 66 to the pull block 28. An air line 70 is attached to inflation block 30 of inflation end 26.

Figure 10A:
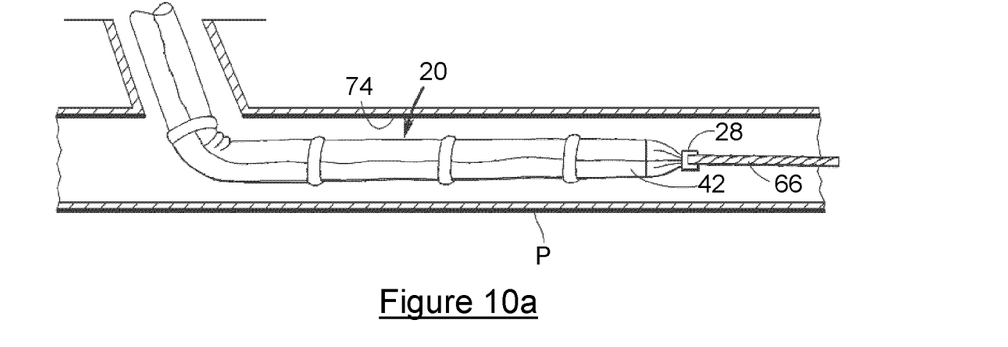
FIGS. 10a to 10c are side elevational views, partly in section, showing installation of the liner assembly of FIG. 1, comprising the liner segment of FIG. 7, into a pipeline to be repaired or reinforced.
Figure 10B:
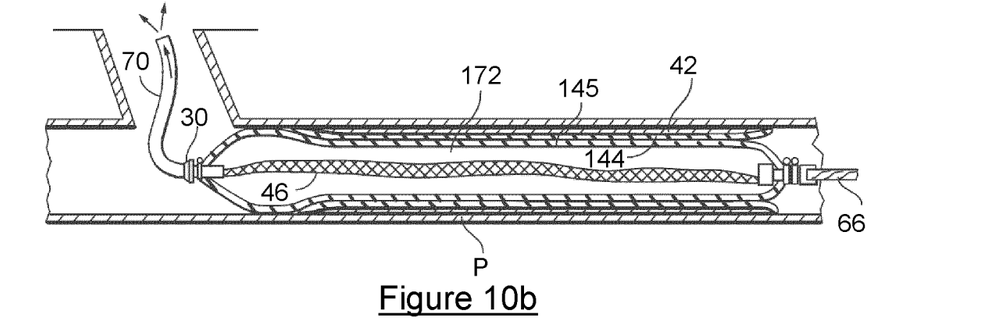

FIGS. 10a through 10c show installation of the liner assembly 20 including liner segment 122 in a section of pipeline P. During installation, the winch (not shown) is used to pull the liner assembly 20 into the pipeline P via winch cable 66, as shown in FIG. 10a. The liner assembly 20 is positioned within the pipeline section to be repaired or reinforced. Once the liner assembly 20 is at the desired position, an air pump (not shown) is operated to supply air through the air line 70 connected to inflation block 30. Air supplied through the air line 70 passes through inflation block 30 and enters internal reservoir 172 of the second inflatable bladder 145. The second inflatable bladder 145 is in turn inflated until the liner assembly 20 expands to the point where the tubular liner 42 firmly contacts the interior surface 74 of the pipeline, as shown in FIG. 10b. During inflation, the taped portions of the liner assembly 20 release, allowing the liner assembly, and surrounding plastic sheathing 50 to expand and contact the interior surface 74. The liner assembly 20 is then maintained in this condition for a time period sufficient to enable the wetted outer felt tubular liner 42 to cure, together with the first inflatable bladder 144 in contact therewith.

Figure 10C:
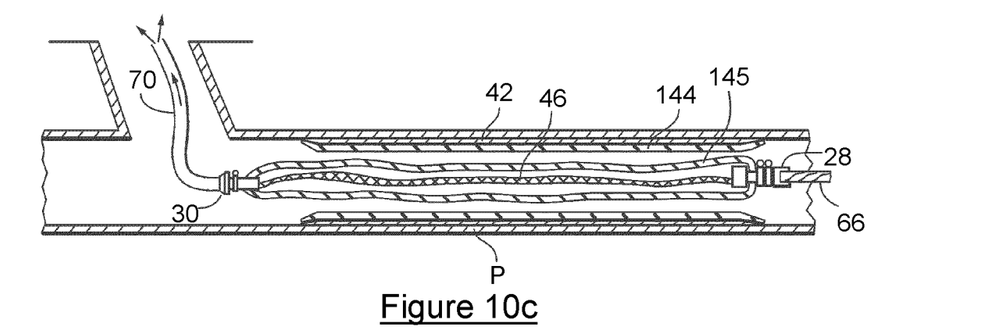

Following curing, the air within the internal reservoir 172 is released through the inflation block 30 and air line 70 (see FIG. 10c). To facilitate this process, the air pump may be used to evacuate air from the internal reservoir 172, allowing the second inflatable bladder 145 to resume its natural flat state. Once evacuated, the second inflatable bladder 145 is then withdrawn from the pipeline P via winch cable 66, leaving the cured tubular liner 42 and first inflatable bladder 144 in position within the pipeline.

The appropriate air pressure for inflating the second inflatable bladder 145 depends on the diameter of the liner assembly. In general, liner assemblies having a diameter ranging from 3" to 12" are inflated to a pressure of about 12 to 15 pounds per square inch (psi). Liner assemblies of smaller diameter (i.e. 1½" and 2" liners) are inflated to a pressure of about 24 psi. During inflation, the air pressure should be sufficient to break the tape 32 spaced along the longitudinally folded liner assembly 20, allowing the liner assembly 20 to fill the pipeline section being repaired or reinforced.

Although in the embodiments described above, the textured outer surface is a roughened surface formed by mechanically abrading the outer surface of the inflatable bladder with an abrasive tool or material, in other embodiments, the textured outer surface may alternatively be a roughened surface formed by chemical abrasion, such as by exposing the outer surface of the inflatable bladder to one or more chemical substances, such as for example solvents, acids, bases and the like. In other embodiments, the textured outer surface may alternatively be a porous surface comprising either open- or closed-cell porosity. In one such embodiment, the inflatable bladder may further comprise porosity just below the outer surface of the inflatable bladder. In one such embodiment, the porous surface may be formed by exposure to one or more chemical substances, such as for example solvents, acids, bases and the like. In another such embodiment, the porosity may be created in the inflatable bladder during manufacture of the inflatable bladder. In still other embodiments, the textured outer surface may be both a roughened surface and a porous surface. In still other embodiments, the textured outer surface may be both a mechanically abraded surface and a chemically treated surface.

Although in the embodiments described above, the textured outer surface is formed during preparation of the cut liner segment, in other embodiments, the textured outer surface may alternatively be already formed in the liner segment provided in stock manufactured lengths, such as during manufacture of the stock liner segment, or following manufacture but prior to preparation of the cut liner segment.

Although in the embodiments described above, the malleable inflatable bladder has a textured outer surface that is configured to bond to the inner surface of the tubular liner, in other embodiments, the inflatable bladder may alternatively have a smooth, non-textured outer surface that is configured to bond to the inner surface of the tubular liner.

Although in the embodiments described above, the malleable inflatable bladder is fabricated of rubber, in other embodiments the malleable inflatable bladder may alternatively be fabricated of silicone. In still other embodiments, the malleable inflatable bladder may alternatively be fabricated of any suitable durable, malleable material. As will be appreciated, the material of which the malleable inflatable bladder is fabricated may be selected to have desired material properties, such as chemical resistance, erosive wear resistance, suitability for food handling, and the like.

Although the installation of the liner assembly has been shown with respect to a linear section of pipeline, the liner assembly may also be used to install a liner in a bent section of pipeline. The ability of the liner assembly to adapt to bends (i.e. 22°, 45°, 90°) is provided by the malleable nature of the inflatable bladder 44 used in the liner assembly. As the liner assembly is inflated in a transitional area, the bladder not only stretches to accommodate the air pressure contained therein, but conforms to the bend so as to ensure the resin-impregnated liner is urged into contact with all surfaces of the transitional area. The inflatable bladder achieves this by allowing variable stretching, i.e. stretching less at the inside edge while stretching more at the outside edge of the bend. Prior art systems that used woven nylon or vinyl bladder systems could not achieve this variable stretching, ultimately resulting in creases and/or folds being formed in the resin-impregnated and resultant cured liner. Additionally, and advantageously, the bonded portion of the inflatable bladder (or the first inflatable bladder) left in position within the pipeline has been found to effectively smoothen any crease and/or fold formed in the resultant cured liner. The reduction and/or elimination of these creases results in greater fluid flow in the repaired section and well as a reduction in the likelihood of debris retainment and possible obstruction.

Although in the embodiments described above, the inflatable bladder has a required length of liner is determined by inserting and moving a video camera connected to a video camera line along the interior of the pipeline, in other embodiments, the required length of liner may alternatively be determined using other methods.

Although in the embodiments described above, the required length of liner is determined by inserting and moving a video camera connected to a video camera line along the interior of the pipeline, in other embodiments, the required length of liner may alternatively be determined using other methods.

Although in the embodiments described above, during preparation of installation end, the strap is tightly incorporated into the folds of the inflatable bladder or the taping used to securely maintain this arrangement, in other embodiments, the strap may alternatively be firmly attached to the pull block, with the inflatable bladder being folded in or cinched in a similar manner as that described above.

Although in the embodiments described above, the ends of the liner segment are sealed around the installation gear in two stages, namely by taping and by clamping, in other embodiments, each of the ends of the liner segment may alternatively be sealed around the installation gear in any manner so as to achieve substantially sealed ends.

Although in the embodiments described above, the tubular liner is fabricated of a felt material, in other embodiments, the tubular liner may alternatively be fabricated of another material.

Although in the embodiments described above, the non-stretchable strap is fabricated of woven nylon, in other embodiments, the non-stretchable strap may alternatively be fabricated of woven vinyl. In still other embodiments, the non-stretchable strap may alternatively be fabricated of any suitable durable, non-stretchable material.

Although in the embodiments described above, the retaining sleeves are fabricated of woven nylon, in other embodiments, the retaining sleeves may alternatively be fabricated of woven vinyl. In still other embodiments, the retaining sleeves may alternatively be fabricated of any suitable durable, non-stretchable material.

Although in the embodiments described above a strap is employed to inhibit longitudinal over-expansion of the liner assembly and sleeves are employed to inhibit radial over-expansion of the liner assembly, those of skill in the art will appreciate that alternative structure or elements may be employed to achieve this functionality.

Although in the embodiments described above, an air pump is operated to supply air through the air line connected to the inflation block for inflating the bladder with air, in other embodiments, another fluid pump may alternatively be operated to supply another fluid through the air line connected to the inflation block for inflating the bladder with the another fluid, where the another fluid may be any fluid such as, for example, any gas, any gas mixture, any liquid, any liquid mixture, or any mixture thereof.

Although preferred embodiments have been described, those of skill in the art will appreciate that variations and modifications may be made without departing from the scope thereof as defined by the appended claims.

What is claimed is:

1. A method of installing a liner assembly for a pipeline repair or reinforcement, the method comprising:
   securing an installation gear to ends of an inner malleable inflatable bladder;
   forming a textured surface on an outer surface of the inflatable bladder after securing the installation gear to the ends thereof;
   pulling a prepared liner assembly into position in the pipeline, the liner assembly comprising an outer tubular liner, the inner malleable inflatable bladder positioned longitudinally within the tubular liner, and the installation gear secured to the ends of the inner malleable inflatable bladder, the inflatable bladder being fabricated of a resilient material and having the textured outer surface configured to bond to the tubular liner and an inner surface configured to provide a resilient surface on the pipeline interior, the tubular liner and the outer surface being wetted with a curable compound;
   introducing fluid into the inflatable bladder so that the inflatable bladder expands to bring the tubular liner into firm contact with an interior surface of the pipeline;
   maintaining the liner assembly in an inflated condition for a time period sufficient for the tubular liner and the outer surface of the inflatable bladder to cure; and
   deflating the inflatable bladder and retrieving at least a portion of the liner assembly from the pipeline.

2. The method of claim 1, wherein the textured outer surface is one or more of a roughened surface and a porous surface.

3. The method of claim 2, wherein the roughened surface is formed by one or more of mechanical abrasion and chemical abrasion.

4. The method of claim 1, wherein the liner assembly further comprises a protective sheathing surrounding the tubular liner.

5. The method of claim 4, wherein the protective sheathing is fitted to the outer surface of the tubular liner.

6. The method of claim 4, wherein the protective sheathing comprises a first longitudinal edge and a second longitudinal edge, the second longitudinal edge being adapted to overlap the first longitudinal edge.

7. The method of claim 6, wherein the overlap is tack welded.

8. The method of claim 1, wherein the inflatable bladder has a longitudinal over-expansion inhibiting element therein.

9. The method of claim 8, wherein the longitudinal over-expansion inhibiting element is a longitudinal strap.

10. The method of claim 8, wherein the inflatable bladder further comprises a radial over-expansion inhibiting structure.

11. The method of claim 10, wherein the radial over-expansion inhibiting structure comprises sleeves adjacent opposite ends of the liner assembly.

12. The method of claim 1, wherein said forming a textured surface on an outer surface of the inflatable bladder comprises one or more of:
   mechanically abrading the outer surface of the inflatable bladder, and
   chemically abrading the outer surface of the inflatable bladder.

13. The method of claim 1, wherein said retrieving at least the portion of the liner assembly from the pipeline comprises retrieving an unbonded portion of the inflatable bladder from the pipeline.

14. The method of claim 13, further comprising:
prior to said retrieving, cutting unbonded portions of the inflatable bladder from a bonded portion of the inflatable bladder using a cutting tool.

15. The method of claim 1, wherein the inflatable bladder having the textured outer surface is a first inflatable bladder, and the liner assembly comprises a second inflatable bladder positioned longitudinally within the first inflatable bladder,
wherein said introducing fluid comprises introducing fluid into the second inflatable bladder,
wherein said maintaining the liner assembly in the inflated condition comprises maintaining the liner assembly in the inflated condition for a time period sufficient for the tubular liner, the outer surface of the first inflatable bladder, and the curable compound to cure,
wherein said deflating the inflatable bladder comprises deflating the second inflatable bladder, and
wherein said retrieving at least the portion of the liner assembly from the pipeline comprises retrieving the second inflatable bladder from the pipeline.

16. The method of claim 1, wherein the installation gear comprises a pull block secured to an installation end of the inner malleable inflatable bladder and an inflation block secured to an inflation end of the inner malleable inflatable bladder.

17. The method of claim 1, wherein the liner assembly comprises:
an outer tubular liner;
a first inner malleable inflatable bladder fabricated of a resilient material and positioned longitudinally within the tubular liner, the first inflatable bladder having a textured outer surface configured to bond to the tubular liner and an inner surface configured to provide a resilient surface on the pipeline interior; and
a second malleable inflatable bladder positioned longitudinally within the first inflatable bladder, with the ends of the second inflatable bladder extending beyond the ends of the first inflatable bladder.

18. The method of claim 1, wherein the tubular liner and the outer surface are wetted with the curable compound by delivering the curable compound to a space between the outer tubular liner and the inner malleable inflatable bladder at one of the ends of the inner malleable inflatable bladder.

19. The method claim 18, wherein a protective sheathing surrounding the outer tubular liner is scored to facilitate migration of the curable compound out of the outer tubular liner so that it can contact an inside surface of a pipe.

* * * * *